United States Patent
Khandekar et al.

(10) Patent No.: US 7,813,453 B2
(45) Date of Patent: Oct. 12, 2010

(54) DATA DETECTION FOR A HIERARCHICAL CODED DATA TRANSMISSION

(75) Inventors: Aamod Khandekar, San Diego, CA (US); Raghuraman Krishnamoorthi, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 409 days.

(21) Appl. No.: 10/821,585

(22) Filed: Apr. 9, 2004

(65) Prior Publication Data

US 2005/0157822 A1    Jul. 21, 2005

Related U.S. Application Data

(60) Provisional application No. 60/538,271, filed on Jan. 21, 2004.

(51) Int. Cl.
*H04L 27/06* (2006.01)
(52) U.S. Cl. ............. 375/340; 375/316; 375/346; 455/63.1; 455/296
(58) Field of Classification Search ............. 375/340, 375/316, 346; 455/63.1, 296
See application file for complete search history.

(56) References Cited

U.S. PATENT DOCUMENTS 5,966,412 A    10/1999    Ramaswamy et al.

(Continued)

FOREIGN PATENT DOCUMENTS

EP    1361686 A1    11/2003

(Continued)

OTHER PUBLICATIONS

Kannan Ramchandran et al., "Multiresolution Broadcast For Digital HDTV Using Joint Source/Channel Coding," IEEE, vol. 11, No. 1, pp. 6-22, Jan. 1993.

(Continued)

*Primary Examiner*—Mohammad H Ghayour
*Assistant Examiner*—Leila Malek
(74) *Attorney, Agent, or Firm*—Sandip (Micky) S. Minhas; Gerald P. Joyce, III

(57) ABSTRACT

Techniques for performing data detection for a hierarchical coded data transmission are described. In one data detection scheme, log-likelihood ratios (LLRs) for code bits of a first data stream are initially derived based on received symbols for the data transmission. The LLRs for the first data stream are decoded to obtain decoded data, which is re-encoded and remodulated to obtain remodulated symbols. Interference due to the first data stream is estimated based on the remodulated symbols. LLRs for code bits of a second data stream are derived based on the LLRs for the code bits of the first data stream and the estimated interference. The LLRs for the first data stream may be derived from the received symbols in real-time without buffering the received symbols. The LLRs for the second data stream may be derived after the first data stream has been decoded.

50 Claims, 6 Drawing Sheets

U.S. PATENT DOCUMENTS

| | | | |
|---|---|---|---|
| 6,516,444 B1 * | 2/2003 | Maru | 714/795 |
| 6,671,338 B1 * | 12/2003 | Gamal et al. | 375/346 |
| 7,173,974 B2 * | 2/2007 | Sindhushayana | 375/262 |
| 2002/0181604 A1 | 12/2002 | Chen | |
| 2003/0076797 A1 * | 4/2003 | Lozano | 370/334 |
| 2003/0103584 A1 * | 6/2003 | Bjerke et al. | 375/340 |
| 2003/0172114 A1 * | 9/2003 | Leung | 709/205 |
| 2004/0038653 A1 * | 2/2004 | Claussen et al. | 455/130 |

FOREIGN PATENT DOCUMENTS

| | | |
|---|---|---|
| JP | 07-066739 | 3/1995 |
| JP | 08-331025 | 12/1996 |
| RU | 2113761 | 6/1998 |
| RU | 2202153 | 4/2003 |

OTHER PUBLICATIONS

Written Opinion—PCT/US04/041476, International Searching Authority—European Patent Office, Jul. 8, 2005.

International Preliminary Report on Patentability—PCT/US04/041476, IPEA/US, Sep. 7, 2006.

International Search Report—PCT/US04/041476, International Search Authority—European Patent Office—Jul. 8, 2005.

* cited by examiner

DATA DETECTION FOR A HIERARCHICAL CODED DATA TRANSMISSION

CLAIM OF PRIORITY UNDER 35 U.S.C. §119

The present Application for Patent claims priority to Provisional Application No. 60/538,271 entitled "Buffer Size Reduction in a Hierarchical Coding System" filed Jan. 21, 2004, and assigned to the assignee hereof and hereby expressly incorporated by reference herein.

BACKGROUND

I. Field

The present invention relates generally to communication, and more specifically to techniques for performing data detection for a hierarchical coded data transmission in a wireless communication system.

II. Background

Hierarchical coding is a data transmission technique whereby multiple (e.g., two) data streams are superimposed (e.g., added) together and transmitted simultaneously. The "coding" in this context refers to channel coding rather than data coding at a transmitter. Hierarchical coding may be advantageously used, for example, to deliver broadcast services to users within a designated broadcast area. These users may experience different channel conditions and achieve different signal-to-noise-and-interference ratios (SNRs). Consequently, these users are capable of receiving data at different data rates. With hierarchical coding, broadcast data may be divided into a "base stream" and an "enhancement stream". The base stream is processed and transmitted in a manner such that all users in the broadcast area can recover the stream. The enhancement stream is processed and transmitted in a manner such that users with better channel conditions can recover the stream.

To recover a hierarchical coded data transmission, a receiver first detects and recovers the base stream by treating the enhancement stream as noise. The receiver then estimates and cancels the interference due to the base stream. The receiver thereafter detects and recovers the enhancement stream with the interference from the base stream canceled. For improved performance, the base stream and enhancement stream are typically recovered sequentially, one stream at a time, in the order described above. Large amount of processing is typically required to recover each stream. Moreover, large amount of buffering may also be required, depending on the manner and speed in which each stream can be detected and recovered. The large amounts of processing and buffering may impact system performance and cost.

There is therefore a need in the art for techniques to efficiently perform data detection for a hierarchical coded data transmission.

SUMMARY

Techniques for performing data detection for a hierarchical coded data transmission are described herein. These techniques may be used for single-carrier as well as multi-carrier (e.g., OFDM) wireless communication systems.

In one data detection scheme, received symbols are initially obtained for a hierarchical coded data transmission with multiple (e.g., two) data streams, and log-likelihood ratios (LLRs) for code bits of a first data stream (the base stream) are derived based on the received symbols. The LLRs for the first data stream are decoded to obtain decoded data, which is further re-encoded and remodulated to obtain remodulated symbols for the first data stream. Interference due to the first data stream is estimated based on the remodulated symbols. LLRs for code bits of a second data stream (the enhancement stream) are then derived based on the LLRs for the code bits of the first data stream and the estimated interference. The LLRs for the first data stream can be (1) derived from the received symbols in real-time without buffering the received symbols and (2) stored in a buffer for decoding. The LLRs for the second data stream may be (1) derived after the first data stream has been decoded and (2) stored in the same buffer by overwriting the LLRs for the first data stream. The received symbols are not used to derive the LLRs for the second data stream and hence do not need to be buffered.

In another data detection scheme, LLRs for the code bits of the first data stream are initially derived based on the received symbols. Estimates of data symbols (or uncoded hard-decision symbols) for the first data stream are then derived based on either the received symbols or the LLRs for the first data stream. The interference due to the first data stream is estimated based on the data symbol estimates and canceled from the received symbols to obtain interference-canceled symbols. LLRs for the code bits of the second data stream are then derived based on the interference-canceled symbols. The LLRs for both the first and second data streams may be computed from the received symbols in real-time without buffering the received symbols. The LLRs for the second data stream may be adjusted/updated after the first data stream has been decoded by (1) detecting for errors in the data symbol estimates based on the remodulated symbols for the first data stream and either (2a) setting LLRs for code bits of data symbol estimates that are in error to erasures or (2b) modifying LLRs for code bits of data symbol estimates that are in error with correction factors derived based on the remodulated symbols and the data symbol estimates.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
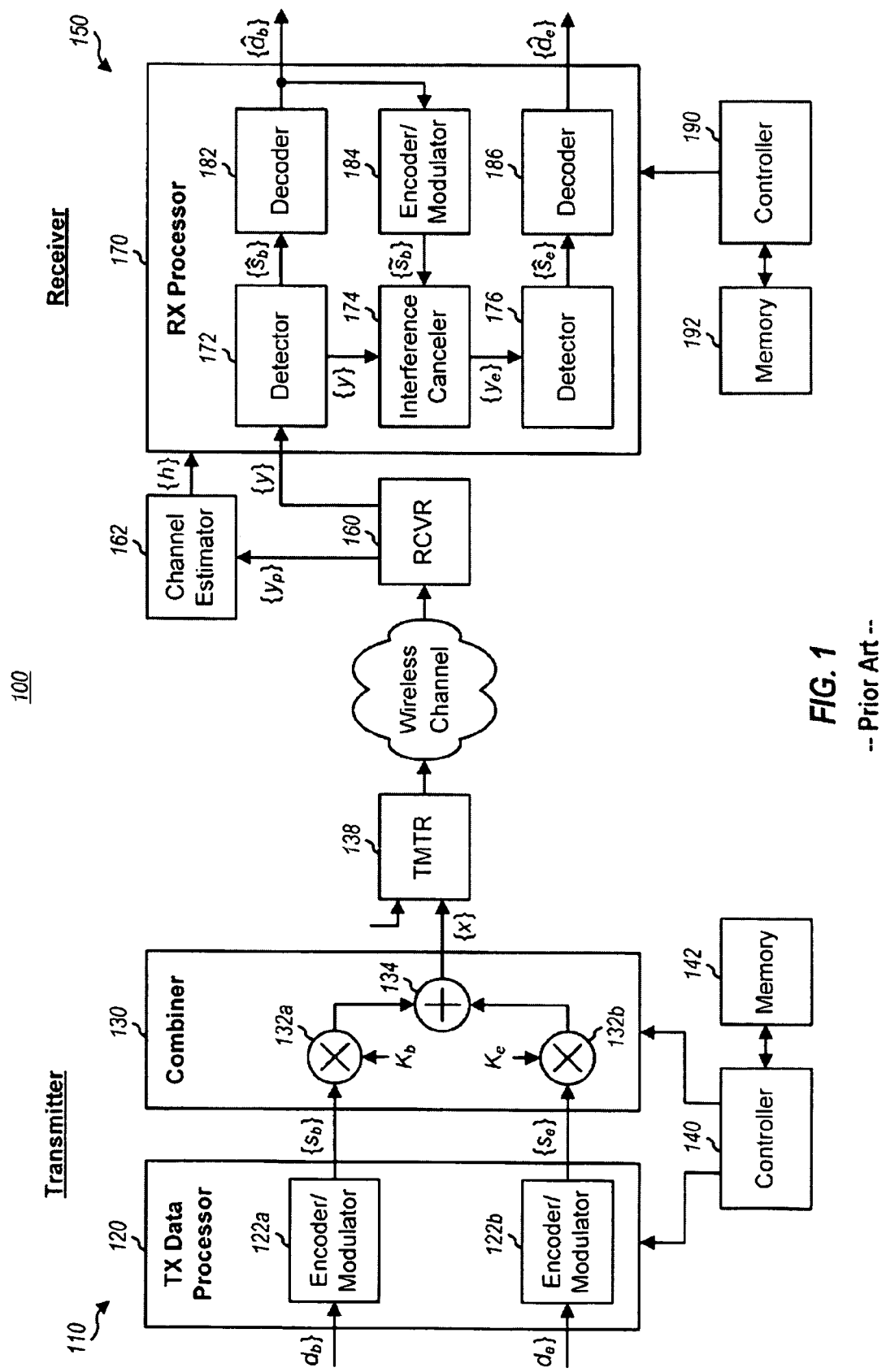
FIG. 1 shows a transmitter and a receiver in a wireless communication system.

FIG. 1 shows a block diagram of a transmitter 110 and a receiver 150 in a wireless communication system 100. At transmitter 110, an encoder/modulator 122a within a transmit (TX) data processor 120 receives, encodes, interleaves, and modulates (i.e., symbol maps) a base data stream (denoted as $\{d_b\}$) and provides a corresponding base symbol stream (denoted as $\{s_b\}$). An encoder/modulator 122b similarly receives, encodes, interleaves, and modulates an enhancement data stream (denoted as $\{d_e\}$) and provides a corresponding enhancement symbol stream (denoted as $\{s_e\}$). The data for each stream is typically encoded in packets, with each packet being encoded separately at the transmitter and decoded separately at the receiver. Symbol streams $\{s_b\}$ and $\{s_e\}$ each contain "data symbols", which are modulation symbols for data.

A combiner 130 receives and combines the base and enhancement symbol streams. Within combiner 130, a multiplier 132a receives and multiplies the base symbol stream $\{s_b\}$ with a scaling factor $K_b$, and a multiplier 132b receives and multiplies the enhancement symbol stream $\{s_e\}$ with a scaling factor $K_e$. The scaling factors $K_b$ and $K_e$ determine the amount of transmit power to use for the base stream and enhancement stream, respectively. A larger fraction of the total transmit power $P_{total}$ is typically allocated to the base stream. A summer 134 receives and sums the scaled data symbols from multiplier 132a with the scaled data symbols from multiplier 132b and provides combined or composite symbols, which may be expressed as:

$$a.\ x=K_b \cdot s_b + K_e \cdot s_e,\qquad\qquad \text{Eq (1)}$$

where $s_b$ is a data symbol for the base stream, $s_e$ is a data symbol for the enhancement stream, and x is a combined symbol. The scaling and combining are performed on a symbol by symbol basis.

A transmitter unit (TMTR) 138 receives a combined symbol stream (denoted as $\{x\}$) from combiner 130 and pilot symbols, processes the combined and pilot symbols based on the system design, and generates one or more modulated signals. A pilot symbol is a modulation symbol for pilot, which is known a priori by both the transmitter and receiver and may be used for channel estimation and other purposes by the receiver. Transmitter unit 138 may perform orthogonal frequency division multiplexing (OFDM) modulation to transmit the combined and pilot symbols on multiple subbands, spatial processing to transmit the combined and pilot symbols from multiple antennas, and so on. The modulated signal(s) are transmitted via a wireless channel to receiver 150.

At receiver 150, a receiver unit (RCVR) 160 receives one or more signals via the wireless channel, processes the received signal(s) in a manner complementary to the processing performed by transmitter unit 138, provides received pilot symbols (denoted as $\{y_p\}$) to a channel estimator 162, and provides a received symbol stream (denoted as $\{y\}$) to an RX processor 170. The received symbols may be expressed as:

$$y=h \cdot x+n=h \cdot [K_b \cdot s_b+K_e \cdot s_e]+n,\qquad\qquad \text{Eq (2)}$$

where h is a complex channel gain for combined symbol x, n is the noise observed by combined symbol x, and y is the received symbol for combined symbol x. The noise n includes channel noise and interference, receiver circuitry noise, and so on.

Channel estimator 162 estimates the response of the wireless channel based on the received pilot symbols and provides channel gain estimates $\{\hat{h}\}$. For simplicity, the description herein assumes channel estimation without error, i.e., $\hat{h}=h$.

RX processor 170 includes detectors 172 and 176, an interference canceller 174, decoders 182 and 186, and an encoder/modulator 184. Detector 172 performs data detection on the received symbol stream $\{y\}$ for the base stream and provides detected symbols for the base stream (denoted as $\{\hat{s}_b\}$). Each detected symbol $\hat{s}_b$ is an estimate of the data symbol $s_b$ and may be represented, for example, by a set of log likelihood ratios (LLRs), as described below. Decoder 182 decodes the detected symbols for the base stream and provides a decoded base stream (denoted as $\{\hat{d}_b\}$). Encoder/modulator 184 then re-encodes and remodulates the decoded base stream in the same manner as that performed by transmitter 110 and provides a remodulated base stream (denoted as $\{\tilde{s}_b\}$), which is an estimate of the base symbol stream $\{s_b\}$ Interference canceller 174 receives the remodulated base stream, estimates and cancels the interference due to the base stream from the received symbol stream, and provides an interference-canceled symbol stream (denoted as $\{y_e\}$) to detector 176. Detector 176 performs data detection on the interference-canceled symbol stream $\{y_e\}$ for the enhancement stream and provides detected symbols for the enhancement stream (denoted as $\{\hat{s}_e\}$). Decoder 186 decodes the detected symbols for the enhancement stream and provides a decoded enhancement stream (denoted as $\{\hat{d}_e\}$).

Controllers 140 and 190 direct the operation at transmitter 110 and receiver 150, respectively. Memory units 142 and 192 provide storage for program codes and data used by controllers 140 and 190, respectively.

The data detection performed by the receiver is influenced by various factors such as the modulation scheme used for each data stream, the specific form used to represent the detected symbols, the technique used to perform the data detection, and so on. For clarity, data detection for a hierarchical coded data transmission with quadrature phase shift keying (QPSK) for both streams and using LLRs to represent the detected symbols is specifically described below.

Figure 2A:
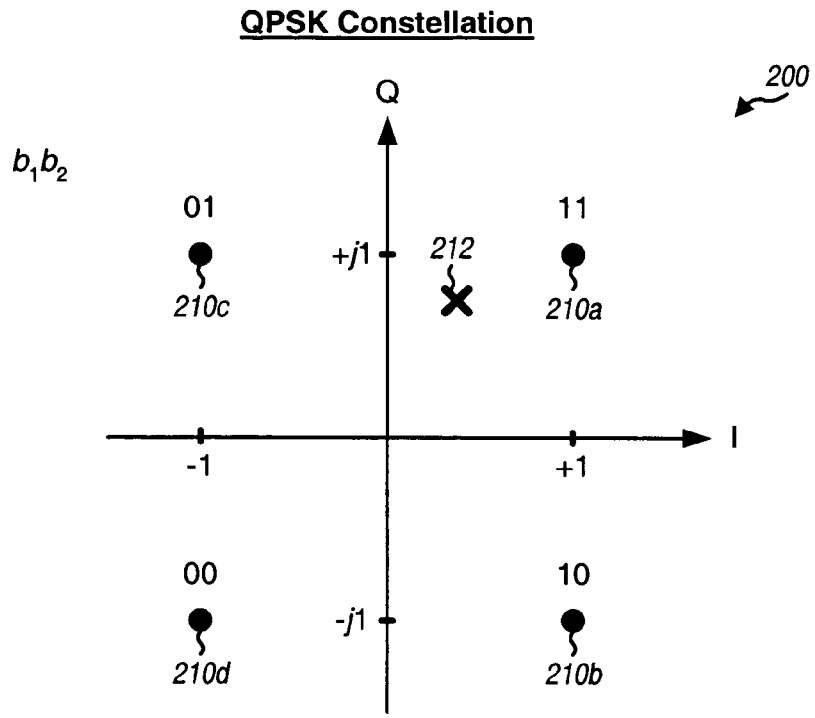
FIG. 2A shows a signal constellation for QPSK.

FIG. 2A shows a signal constellation 200 for QPSK, which includes four signal points 210a through 210d on a two-dimensional complex plane. These four signal points are located at coordinates of 1+j1, 1−j1, −1+j1, and −1−j1 and are given labels of '11', '10', '01', and '00', respectively. For QPSK modulation, each pair of code bits (denoted as $b_1$ and $b_2$) is mapped to one of the four possible signal points, and the complex value for the mapped signal point is the modulation symbol for the pair of code bits. For example, bit $b_1$ may be used for an inphase (I) component and bit $b_2$ may be used for a quadrature (Q) component of the modulation symbol. In this case, the modulation symbol for each pair of code bits may be expressed as: $s=b_1+jb_2$, where $b_1 \in \{1, -1\}$ and $b_2 \in \{1, -1\}$.

Figure 2B:
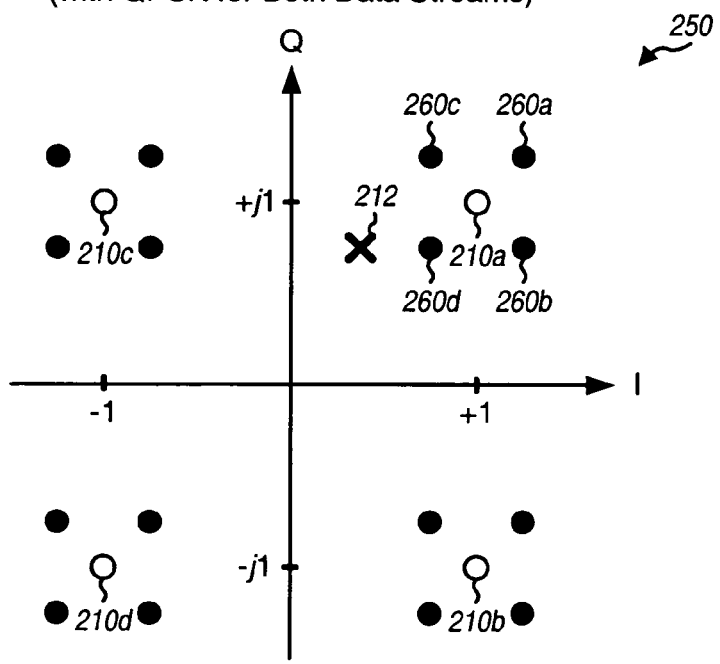
FIG. 2B shows a signal constellation for hierarchical coding with QPSK for both the base stream and enhancement stream.

FIG. 2B shows a signal constellation 250 for hierarchical coding with QPSK for both the base stream and enhancement stream. The QPSK constellation for the base stream is represented by four signal points 210a through 210d. The QPSK constellation for the enhancement stream is superimposed on the QPSK constellation for the base stream and is represented by four signal points 260a through 260d on each signal point 210. The scaling factors $K_b$ and $K_e$ determine (1) the distance between the base stream signal points 210 and center of the complex plane and (2) the distance between the enhancement stream signal points 260 and the base stream signal points 210.

Referring back to FIG. 2A, with QPSK, a modulation symbol for one of only four possible signal points is transmitted for each pair of code bits. However, because of noise, interference, and distortion in the wireless channel, a received symbol (e.g., symbol 212 in FIG. 2A) may not fall directly on one of the four possible signal points. Data detection is performed to remove the effect of the wireless channel (e.g., to remove the complex channel gain h) and to ascertain which one of the four possible signal points is the transmitted data symbol s. The information for each detected symbol $\hat{s}$ is often represented in the form of an LLR for each of the two constituent code bits $b_1$ and $b_2$ for the detected symbol. Each LLR indicates the likelihood of its code bit $b_i$ being a one ('1' or +1) or a zero ('0' or −1). The LLR for the i-th code bit of detected symbol $\hat{s}$ may be expressed as:

$$LLR_i = \log\left[\frac{\Pr(\hat{s} \mid b_i = 1)}{\Pr(\hat{s} \mid b_i = -1)}\right], \text{ for } i = 1, 2 \text{ for } QPSK, \quad \text{Eq (3)}$$

where $b_i$ is the i-th code bit for detected symbol $\hat{s}$;
Pr ($\hat{s}|b_i=1$) is the probability of detected symbol $\hat{s}$ with bit $b_i$ being 1;
a. Pr($\hat{s}|b_i=-1$) is the probability of detected symbol $\hat{s}$ with bit $b_i$ being −1; and
b. $LLR_i$ is the LLR of code bit $b_i$.

An LLR is a bi-polar value, with a larger positive value corresponding to higher likelihood of the code bit being a +1 and a larger negative value corresponding to higher likelihood of the code bit being a −1. An LLR of zero indicates that the code bit is equally likely to be +1 or −1. The LLR for each code bit is typically quantized to a predetermined number of bits (or L bits, where L>1) to facilitate storage. The number of bits to use for the LLRs is dependent on various factors such as the requirements of the decoder, the SNR of the detected symbols, and so on.

FIG. 1 shows a symbolic representation of the data detection for a hierarchical coded data transmission. The data detection may be performed in various manners. Three data detection schemes are described below.

Figure 3:
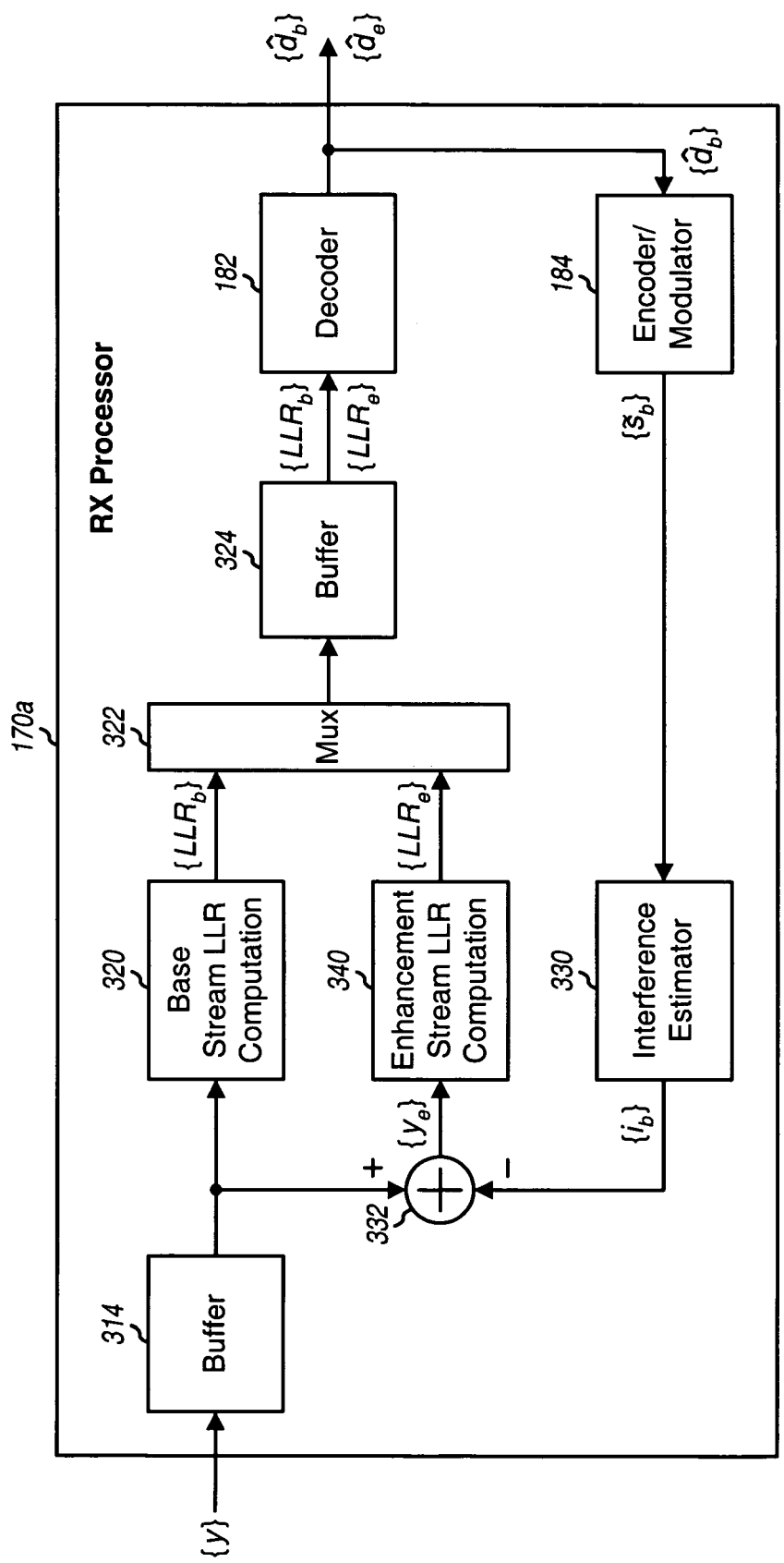
FIG. 3 shows a receive (RX) processor for a first data detection scheme.

FIG. 3 shows an RX processor 170a for a first data detection scheme in which the base stream and enhancement stream are both detected based on the received symbols {y}. RX processor 170a is an embodiment of RX processor 170 in FIG. 1.

Within RX processor 170a, the received symbols {y} are initially stored in a buffer 314. A base stream LLR computation unit 320 retrieves the received symbols from buffer 314 and performs data detection on each received symbol y to obtain two LLRs for two code bits of a base stream symbol $s_b$ that is carried in that received symbol. The two LLRs for the base stream may be expressed as:

$$LLR_{b1} + jLLR_{b2} = y \cdot h^* \cdot \frac{2\sqrt{2E_b}}{N_{0,b}}, \quad \text{Eq (4)}$$

where $LLR_{b1}$ and $LLR_{b2}$ are the LLRs for the two bits of base stream symbol $s_b$ within received symbol y;
a. h is a channel gain estimate for received symbol y;
b. "*" denotes a complex conjugate;
c. $E_b$ is the energy of the base stream symbol $s_b$; and
d. $N_{0,b}$ is the noise and interference power observed by the base stream symbol $s_b$.

The base stream symbol $s_b$ is assumed to have a complex value of $\pm\sqrt{E_b/2}\pm j\sqrt{E_b/2}$. The base stream symbol energy is $E_b=E_{total}\cdot K_b^2/(K_b^2+K_e^2)$ and the enhancement stream symbol energy is $E_e=E_{total}\cdot K_e^2/(K_b^2+K_e^2)$, where $E_{total}$ is the total energy for the combined symbol x. The noise and interference power $N_{0,b}$ includes channel noise $N_0$ and the interference from the enhancement stream. Computation unit 320 provides the base stream LLRs (denoted as $\{LLR_b\}$) via a multiplexer (Mux) 322 to a buffer 324 for storage.

Decoder 182 receives and decodes the base stream LLRs from buffer 324 and provides decoded data $\{\hat{d}_b\}$ for the base stream. Decoder 182 may implement a Turbo decoder or a Viterbi decoder if Turbo coding or convolutional coding, respectively, was performed at the transmitter. A Turbo decoder performs decoding on the LLRs for multiple iterations to obtain increasingly better estimates of the transmitted data bits. The decoding process typically requires some amount of time to complete and may further require storage of the base stream LLRs for the duration of the decoding process (e.g., for a Turbo decoder).

After the base stream LLRs have been decoded, the decoded data $\{\hat{d}_b\}$ is re-encoded and remodulated by encoder/modulator 184 to obtain remodulated symbols $\{\tilde{s}_b\}$. An interference estimator 330 receives and multiplies the remodulated symbols $\{\tilde{s}_b\}$ with the channel gain estimates $\{h\}$ and provides interference estimates $\{i_b\}$ due to the base stream. A summer 332 receives and subtracts the interference estimates $\{i_b\}$ from the received symbols {y} obtained from buffer 314 and provides interference-canceled symbols $\{y_c\}$, which may be expressed as:

$$a. \ y_e = y - i_b = y - h\cdot\tilde{s} \cong y - h\cdot s_b. \quad \text{Eq (5)}$$

The remodulated symbol $\tilde{s}_b$ is equal to the base stream symbol $s_b$ if the base stream is decoded correctly. Whether the base stream is decoded correctly or in error may be determined based on a CRC (cyclic redundancy check) or some other error detection scheme.

An enhancement stream LLR computation unit 340 performs data-detection on the interference-canceled symbols $\{y_e\}$ to obtain two LLRs for the two code bits of each enhancement stream symbol $s_e$. The two LLRs for the enhancement stream may be expressed as:

$$a. \ LLR_{e1} + jLLR_{e2} = y_e \cdot h^* \cdot \frac{2\sqrt{2E_e}}{N_{0,e}}, \quad \text{Eq (6)}$$

where $LLR_{e1}$ and $LLR_{e2}$ are the LLRs for the two bits of enhancement stream symbol $s_e$ derived based on interference-canceled symbol $y_e$;
a. $E_e$ is the energy of enhancement stream symbol $s_e$; and
b. $N_{0,e}$ is the noise and interference power observed by enhancement stream symbol $s_e$.

Computation unit 340 provides the enhancement stream LLRs (denoted as $\{LLR_e\}$) via Mux 322 to buffer 324 for storage. Decoder 182 then decodes the enhancement stream LLRs to obtain decoded data for the enhancement stream, $\{\hat{d}_e\}$.

For the first data detection scheme, RX processor 170a needs to store the received symbols {y} in buffer 314 and the base stream LLRs in buffer 324 while the base stream is decoded by decoder 182. The sizes of buffers 314 and 324 are dependent on the data packet size, decoding delays, and possibly other factors. The same buffer 324 may be used to store both the base stream LLRs and the enhancement stream LLRs since these streams are decoded sequentially.

Figure 4:
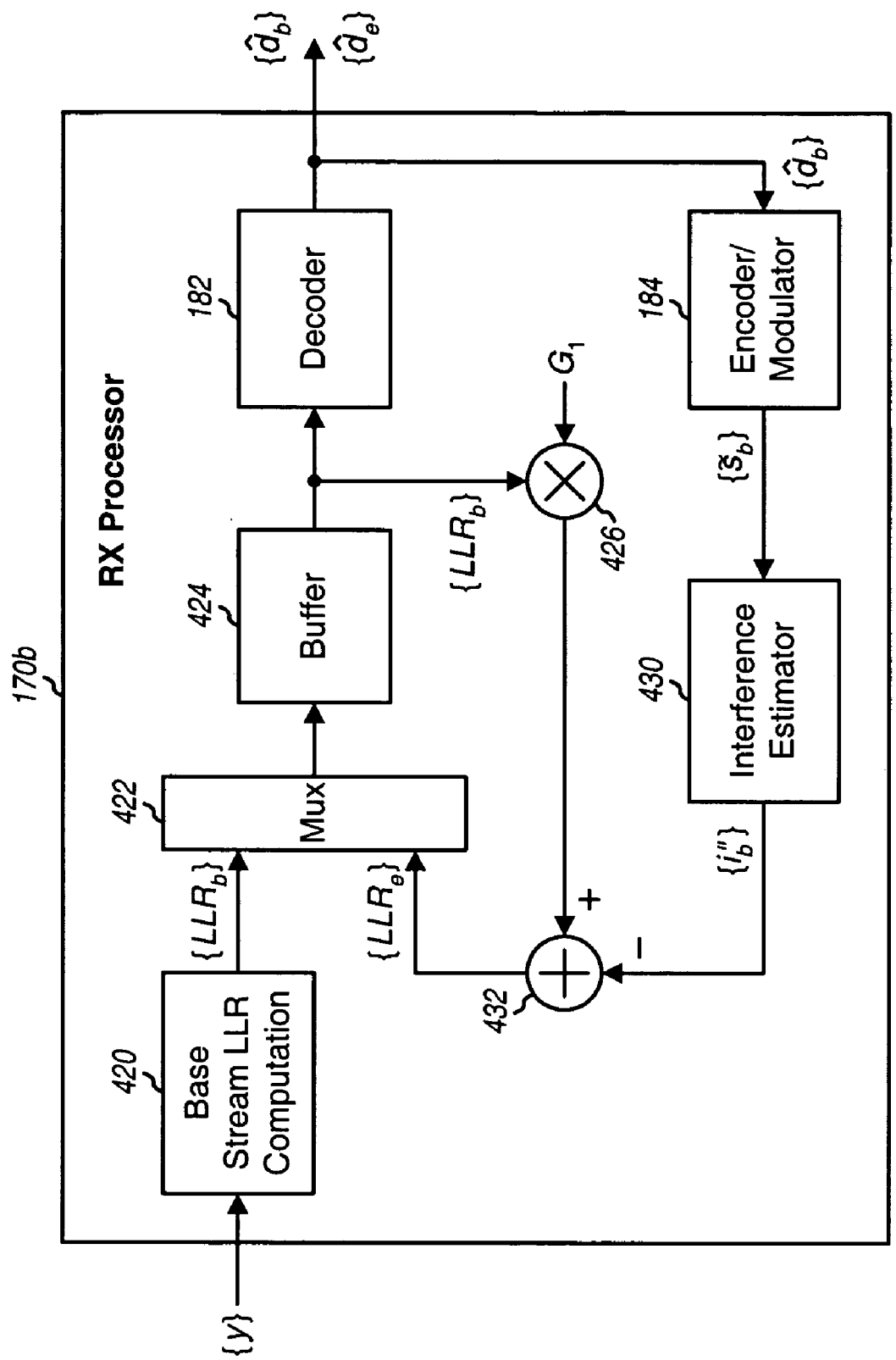
FIG. 4 shows an RX processor for a second data detection scheme.

FIG. 4 shows an RX processor 170b for a second data detection scheme in which the base stream is detected based on the received symbols {y} and the enhancement stream is detected based on the base stream LLRs. RX processor 170b is another embodiment of RX processor 170 in FIG. 1.

Within RX processor 170b, a base stream LLR computation unit 420 performs data detection on the received symbols {y} to obtain the base stream LLRs {$LLR_b$}, as shown in equation (4). Computation unit 420 provides the base stream LLRs via a multiplexer 422 to a buffer 424 for storage. Decoder 182 receives and decodes the base stream LLRs from buffer 424 and provides decoded data {$\hat{d}_b$} for the base stream. After the base stream LLRs have been decoded, encoder/modulator 184 re-encodes and remodulates the decoded data {$\hat{d}_b$} to obtain remodulated symbols {$\tilde{s}_b$} for the base stream.

The base stream LLRs are derived from, and are closely related to, the received symbols. The enhancement stream LLRs may thus be computed directly from the base stream LLRs instead of the received symbols. The enhancement stream LLRs may be expressed as:

$$LLR_{e1} + jLLR_{e2} = (y - h \cdot \tilde{s}_b) \cdot h^* \cdot \frac{2\sqrt{2E_e}}{N_{0,e}}, \quad \text{Eq (7)}$$

$$= y \cdot h^* \cdot \frac{2\sqrt{2E_e}}{N_{0,e}} -$$

$$\tilde{s}_b \cdot |h|^2 \cdot \frac{2\sqrt{2E_e}}{N_{0,e}},$$

$$= \left(y \cdot h^* \cdot \frac{2\sqrt{2E_b}}{N_{0,b}}\right) \frac{\sqrt{2E_e}/N_{0,e}}{\sqrt{2E_b}/N_{0,b}} -$$

$$\tilde{s}_b \cdot |h|^2 \cdot \frac{2\sqrt{2E_e}}{N_{0,e}},$$

$$= (LLR_{b1} + jLLR_{b2}) \cdot$$

$$G_1 - \tilde{s}_b \cdot |h|^2 \cdot G_2,$$

where $G_1 = (\sqrt{2E_e}/N_{0,e})/(\sqrt{2E_b}/N_{0,b})$, $G_2 = 2\sqrt{2E_e}/N_{0,e}$, and $|h|^2$ denotes the channel power gain estimate for received symbol y. The first equality in equation (7) is obtained by substituting equation (5) into equation (6). The quantity within the parenthesis in the third equality is for the base stream LLRs. Equation (7) indicates that the enhancement stream LLRs may be derived from the base stream LLRs and the remodulated symbols.

Within RX processor 170b, a multiplier 426 receives and scales the base stream LLRs with the gain $G_1$ and provides scaled base stream LLRs. An interference estimator 430 receives and multiplies each remodulated symbol $\tilde{s}_b$ with both its channel power gain estimate $|h|^2$ and the gain $G_2$ to obtain an interference estimate $i_b" = \tilde{s}_b \cdot |h|^2 \cdot G_2$ due to the base stream. The processing by interference estimator 430 is different from the processing by interference estimator 330 in FIG. 3. A summer 432 receives and subtracts the interference estimate $i_b"$ from the scaled base stream LLRs and provides the enhancement stream LLRs, which are sent via Mux 422 and to buffer 424 for storage. Decoder 182 then decodes the enhancement stream LLRs to obtain decoded data {$\hat{d}_e$} for the enhancement stream. As shown in equation (7), the received symbols {y} are not used to derive the enhancement stream LLRs.

For the second data detection scheme, RX processor 170b does not need to store the received symbols and only one buffer 424 can be used to store both the base stream LLRs and the enhancement stream LLRs. This may greatly reduce buffering requirements for the receiver.

The base stream LLRs are quantized and stored with a sufficient number of bits such that these LLRs provide good decoding performance for the base stream and can further be used to derive the enhancement stream LLRs. For the second data detection scheme, the number of bits to use for the base stream LLRs affects the precision and range of the LLRs for both streams. In one specific Turbo decoder implementation, the LLRs are quantized to six bits with a range of [−8, 8] and a precision of 0.25. The precision denotes the maximum possible quantization error. The range and precision are typically both selected based on decoding performance and are only indirectly related to the signal-to-quantization-noise ratio (SQNR). Moreover, the range and precision are typically not changed based on factors such as code rate or operating SNR.

The precision of the enhancement stream LLRs is affected by the gain $G_1$ used to scale the base stream LLRs in equation (7). If the noise and interference power $N_{0,b}$ observed by the base stream is dominated by the channel noise $N_0$ and not the interference from the enhancement stream, then $N_{0,b}$ is approximately equal to $N_0$ and the enhancement stream will have a lower SNR than that of the base stream because less power is typically used for the enhancement stream. In this case, the gain $G_1$ will be less than one and, since the base stream LLRs are scaled by $G_1$, the precision of the enhancement stream LLRs is not impacted by the precision of the base stream LLRs. However, if the gain $G_1$ is greater than one, then one or more additional low-order/less significant bits may be used for the base stream LLRs.

The range for the quantization should be sufficiently large so that the base stream LLRs are not saturated or clipped at too low a value, which can degrade performance. Saturation of the base stream LLRs typically does not pose a serious problem for the Turbo decoder but may severely impact the quality of the enhancement stream LLRs that are derived from the base stream LLRs. To determine how many additional high-order bits are needed in order to prevent LLR saturation, the received symbol y in equation (4) may be replaced with $h \cdot s_b + n$, as follows:

$$LLR_{b1} + jLLR_{b2} = (h \cdot s_b + n_b) \cdot h^* \cdot \frac{2\sqrt{2E_b}}{N_{0,b}}, \quad \text{Eq (8)}$$

$$= s_b \cdot |h|^2 \cdot \frac{2\sqrt{2E_b}}{N_{0,b}} + n_b \cdot h^* \cdot \frac{2\sqrt{2E_b}}{N_{0,b}},$$

where $n_b$ represents the noise and interference observed by the base stream, which includes the interference from the enhancement stream.

If a base stream symbol $s_b = \sqrt{E_b/2} + j\sqrt{E_b/2}$ is transmitted, then each of the two LLRs for the symbol $s_b$ would have a mean of $\mu_b = 2E_b \cdot |h|^2/N_{0,b} = 2 \cdot SNR_b$ and a standard deviation of $\sigma_b^2 = 2\sqrt{E_b \cdot |h|^2/N_{0,b}} = 2\sqrt{SNR_b}$. The SNR for the base stream is then $SNR_b = E_b \cdot |h|^2/N_{0,b}$. Assuming a "reasonable" variation of mean plus three times the standard deviation for the received symbol y, the magnitude of the LLRs should be able to take on values up to $\mu_b + 3\sigma_b^2 = 2 \cdot SNR_b + 6\sqrt{SNR_b}$. This number increases with increasing SNR for the base stream. Thus, the worst case is when the channel noise is zero and the base stream SNR hits a noise floor caused by the interference from the enhancement stream. At this point, the SNR of the base stream is $SNR_b = E_b/E_e$, and the maximum LLR magnitude to accommodate is $2 \cdot E_b/E_e 6\sqrt{E_b/E_e}$. It should be noted that this is a conservative range because when $N_{0,b}$ is dominated by the interference from the enhancement stream, the noise is no longer Gaussian noise but QPSK noise, which does not vary beyond mean plus a single standard deviation.

The number of bits to use for the base stream LLRs may be selected based on the ratio of the base stream symbol energy to the enhancement stream symbol energy. For example, if the power of the base stream is four times stronger than that of the enhancement stream (or $E_b/E_e=4$), then the base stream LLRs should be quantized with a magnitude of up to $2\cdot 4+6\sqrt{4}=20$. For the exemplary Turbo decoder implementation described above with a range of [−8, 8], the base stream LLRs can be quantized and stored with two additional high-order bits, or 8 bits total. As another example, if the power of the base stream is nine times stronger than that of the enhancement stream (or $E_b/E_e=9$), then the base stream LLRs should be quantized with a magnitude of up to $2\cdot 9+6\sqrt{9}=36$, and three additional high-order bits can be used for the LLRs.

Although the base stream LLRs may be stored with additional bits for the second data detection scheme, the total memory requirement may still be significantly less than that of the first data detection scheme, which stores both the received symbols and the base stream LLRs. This is especially true since the received symbols are also likely to require a larger bit-width in the presence of the enhancement stream.

Figure 5:
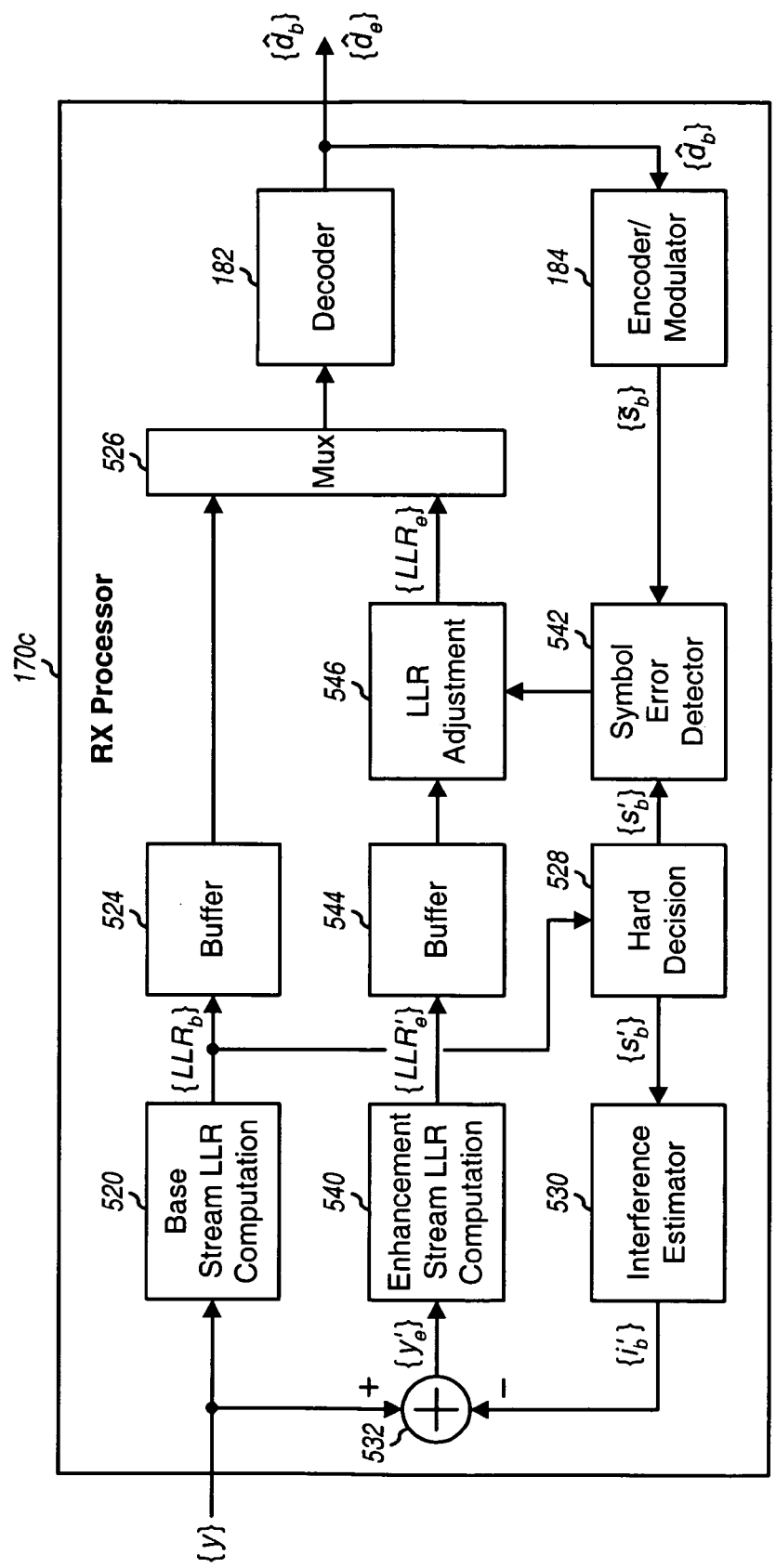
FIG. 5 shows an RX processor for a third data detection scheme.

FIG. 5 shows an RX processor 170c for a third data detection scheme in which the base stream is detected based on the received symbols {y} and the enhancement stream is detected using uncoded interference cancellation. RX processor 170c is yet another embodiment of RX processor 170 in FIG. 1.

Within RX processor 170c, a base stream LLR computation unit 520 performs data detection on the received symbols {y} to obtain the base stream LLRs, as shown in equation (4). Computation unit 520 provides the base stream LLRs to a buffer 524 for storage. Decoder 182 receives the base stream LLRs from buffer 524 via a multiplexer 526, decodes these LLRs, and provides decoded data $\{\hat{d}_b\}$ for the base stream.

For the third data detection scheme, the enhancement stream LLRs are computed from the received symbols {y}, similar to the first data detection scheme. However, the interference due to the base stream is estimated based on uncoded data symbol estimates (instead of the remodulated symbols) for the base stream. The enhancement stream LLRs can thus be computed concurrently with the base stream LLRs, instead of having to wait for the decoding of the base stream to be completed.

An uncoded data symbol estimate $s_b'$ (or simply, a data symbol estimate) is an estimate of a base stream symbol $S_b$ obtained by making a hard decision on either a received symbol y or the base stream LLRs for received symbol y. For example, referring to FIG. 2A, a data symbol estimate for received symbol 212 may be the signal point at 1+j1, which is the closest signal point to received symbol 212. Data symbol estimates are derived based on the received symbols without the benefit of the error correction capability of the code used for the base stream. Data symbol estimates are thus more prone to errors than remodulated symbols, which benefit from the error correction capability of the base stream code. Consequently, the uncoded interference estimates $\{i_b'\}$ derived from the data symbol estimates are less reliable, and the enhancement stream LLRs derived from uncoded interference-canceled symbols $\{y_e'\}$ are also less reliable than those derived by the first data detection scheme. Decoding performance for the enhancement stream may be degraded if the LLRs for data symbol estimates that are in error are given high reliability values (or greater weight) in the decoding process.

Various schemes may be used to mitigate the deleterious effects of data symbol errors (or hard-decision symbol errors) in the decoding of the enhancement stream. Data symbol errors may be detected by comparing each remodulated symbol against the corresponding data symbol estimate and declaring an error if the two are not equal.

In a first error compensation scheme, enhancement stream LLRs corresponding to data symbol estimates that are in error are given no weight in the decoding process. This can be achieved by setting these LLRs to erasures, which are LLR values of zero indicating equal likelihood of the code bits being +1 or −1. If the symbol error rate (SER) is relatively low, then the effects of using erasures for LLRs corresponding to data symbol errors may be small. For example, at a noise floor of 6 dB (which corresponds to a base stream having four times the power of the enhancement stream), the SER is approximately two percent. The degradation in decoding performance from declaring these hard-decision symbol errors as erasures should not be significant.

In a second error compensation scheme, the enhancement stream LLRs obtained with data symbol estimates that are in error are updated based on the remodulated symbols after the base stream has been decoded. The enhancement stream LLRs from equation (7) may be expressed as:

$$LLR_{e1} + jLLR_{e2} = (y - h\cdot\tilde{s}_b)\cdot h^* \cdot \frac{2\sqrt{2E_e}}{N_{0,e}}, \quad \text{Eq (9)}$$

$$= (y - h\cdot s_b')\cdot h^* \cdot \frac{2\sqrt{2E_e}}{N_{0,e}} +$$

$$(s_b' - \tilde{s}_b)\cdot |h|^2 \cdot \frac{2\sqrt{2E_e}}{N_{0,e}},$$

$$= (LLR_{e1}' + jLLR_{e2}') +$$

$$(s_b' - \tilde{s}_b)\cdot |h|^2 \cdot G_2,$$

where $LLR_{e1}'$ and $LLR_{e2}'$ are initial LLRs for the two bits of an enhancement stream symbol $s_e$. Equation (9) indicates that the initial $LLR_{e1}'$ and $LLR_{e2}'$ can be obtained based on the received symbol y and the data symbol estimate $s_b'$. Once the base stream has been decoded and the remodulated symbols are available, the initial $LLR_{e1}'$ and $LLR_{e2}'$ can be updated with the remodulated symbol $\tilde{s}_b$ to obtain the final $LLR_{e1}$ and $LLR_{e2}$, which can be decoded to obtain decoded data for the enhancement stream. If the initial LLRs are saturated, then these LLRs may be set to erasures. The final LLRs are retained even if they are saturated.

Within RX processor 170c, a hard decision unit 528 receives either the base stream LLRs (as shown in FIG. 5) or the received symbols (not shown in FIG. 5) and performs hard decision to derive data symbol estimates $\{s_b'\}$ for the base stream. The hard decision may be performed as known in the art. For example, each data symbol estimate may be set to the signal point closest in distance to the received symbol. Unlike the remodulated symbols, the data symbol estimates may be derived with minimal delay.

An interference estimator 530 receives and multiplies the data symbol estimates $\{s_b'\}$ with the channel gain estimates {h} and provides the uncoded interference estimates $\{i_b'\}$ due to the base stream, which may be expressed as: $i_b'=h\cdot s_b'$. A summer 532 receives and subtracts the interference estimates $\{i_b'\}$ from the received symbols {y} and provides uncoded interference-canceled symbols $\{y_e'\}$, which may be expressed as: $y_e'=y-i_b'=y-h\cdot s_b'$. An enhancement stream LLR computation unit 540 performs data detection on the uncoded interference-canceled symbols $\{y_e'\}$ to obtain the initial enhancement stream LLRs $\{LLR_e'\}$, similar to that shown in equation (6). Computation unit 540 provides the initial enhancement stream LLRs to a buffer 544 for storage.

After the base stream LLRs have been decoded, encoder/modulator 184 re-encodes and remodulates the decoded data $\{\hat{d}_b\}$ to obtain remodulated symbols $\{\tilde{s}_b\}$ for the base stream. A symbol error detector 542 receives the remodulated symbols $\{\tilde{s}_b\}$ and the data symbol estimates $\{\hat{s}_b'\}$, detects for errors in the data symbol estimates, and provides an indication for each data symbol estimate detected to be in error. Symbol error detector 542 may further compute a correction factor $c_b = (s_b' - \tilde{s}_b) \cdot |h|^2 \cdot G_2$ for each data symbol estimate that is in error, if the second error compensation scheme is used. An LLR adjustment unit 546 receives and adjusts the initial enhancement stream LLRs $\{LLR_e'\}$ from buffer 544 and provides final enhancement stream LLRs $\{LLR_e\}$ via multiplexer 526 to decoder 182. LLR adjustment unit 546 may (1) set the enhancement stream LLRs for data symbol estimates that are in error to erasures, for the first error compensation scheme, or (2) add the correction factor $c_b$ to the initial enhancement stream LLRs for each data symbol estimate that is in error, for the second error compensation scheme.

For the third data detection scheme, RX processor 170c does not need to store the received symbols, and two buffers 524 and 544 are used to store the base stream LLRs and the enhancement stream LLRs, respectively.

For clarity, the three data detection schemes have been described above for QPSK. These data detection schemes may also be used for higher-order modulation schemes, which are modulation schemes of higher order than QPSK. The first and third data detection schemes may be used in the manner described above with any modulation scheme for the base stream and any modulation scheme for the enhancement stream. For the third data detection scheme, the correction factor $c_b = (s_b' - \tilde{s}_b) \cdot |h|^2 \cdot G_2$ may be used to update the initial LLRs, in accordance with the modulation scheme used for the enhancement stream, whenever data symbol estimates are detected to be in error.

For the second data detection scheme, the base stream LLRs contain all of the information in the received symbols and can thus be used to estimate or reconstruct the received symbols. The enhancement stream LLRs can then be computed from the received symbol estimates. The estimation of the received symbols from the base stream LLRs may be performed as described below. For simplicity, the following description assumes that a Gray-mapped modulation scheme with a higher order than QPSK is used for the base stream. With Gray mapping, neighboring signal points in a constellation (in both the horizontal and vertical directions for a square constellation) have labels that differ in only one bit position. Gray mapping reduces the number of code bit errors for more likely error events, which corresponds to a received symbol being mapped to a signal point near the correct signal point, in which case only one code bit would be in error. The following description also assumes that the base stream LLRs are computed using a "dual-max approximation", which may be expressed as:

$$LLR_i = \frac{|y - h \cdot s_{i,1}|^2}{N_{0,b}} - \frac{|y - h \cdot s_{i,0}|^2}{N_{0,b}}, \quad \text{Eq (10)}$$

$$= |h|^2 \cdot \left( \frac{|(y/h) - s_{i,1}|^2}{N_{0,b}} - \frac{|(y/h) - s_{i,0}|^2}{N_{0,b}} \right),$$

where $LLR_i$ is the LLR for the i-th code bit for received symbol y;

a. $s_{i,1}$ is a hypothesized modulation symbol that is closest to received symbol y such that the i-th code bit for $s_{i,1}$ has a value of +1; and b. $s_{i,0}$ is a hypothesized modulation symbol that is closest to received symbol y such that the i-th code bit for $s_{i,0}$ has a value of −1.

A signal constellation for an M-ary PSK or M-QAM modulation scheme contains M signal points. Each signal point is associated with a B-bit label, where $B = \log_2 M$. B code bits are mapped to a modulation symbol, which is a complex value for a signal point whose label is equal to the values of the B code bits. B LLRs are computed for each received symbol y, with each LLR being computed based on a respective pair of hypothesized modulation symbols, $s_{i,1}$ and $s_{i,0}$.

Equation (10) provides one equation with respect to the received symbol y for each code bit of a modulation symbol s being detected. Thus, there are three equations for each received symbol for 8-PSK (B=3), four equations for each received symbol for 16-QAM (B=4), and so on. It can be shown that the B equations derived from equation (10) for the B code bits are linear equations. From these B equations, two unknowns, namely the real and imaginary parts of the received symbol y, can be determined. However, the difficulty is that a different pair of hypothesized modulation symbols $s_{i,1}$ and $s_{i,0}$ is used for each of the B equations for the received symbol y, and these hypothesized modulation symbols are not known. For Gray-mapped 8-PSK and 16-QAM, the hypothesized modulation symbols can be determined for at least two of the B code bits for each received symbol y using the technique described below. Two (independent) linear equations are then available to compute the two unknowns for the real and imaginary parts of the received symbol y.

The values of $S_{i,1}$ and $s_{i,0}$ for two code bits for the received symbol y can be determined as follows. First, equation (10) indicates that the sign of each code bit LLR is determined by the hypothesized modulation symbol that is closest to y/h. For example, if $s_{i,1}$ is closer to y/h than $s_{i,0}$, then $|(y/h) - s_{i,1}|^2$ will be smaller than $|(y/h) - s_{i,0}|^2$, and $LLR_i$ will be a negative value. Conversely, if $s_{i,0}$ is closer to y/h than $s_{i,1}$, then $LLR_i$ will be a positive value. Turning this fact around, the signs of the B code bit LLRs (hard bit-decisions) determine the signal point $s_c$ (hard symbol-decision) that is closest to y/h. For example, if $LLR_1 = +a$, $LLR_2 = +b$, and $LLR_3 = -c$ for an 8-PSK symbol, where a, b, and c are all positive values, then the closest signal point to this 8-PSK symbol has a label of '001'.

To simplify notation, the closest signal point $s_c$ can be re-labeled with an all-zero label by performing an exclusive-OR (XOR) on the label of each signal point in the constellation with the label of the closest signal point. In this new notation, the hypothesized symbol $s_{i,0}$ for each of the B code bits is equal to the closest signal point $s_c$, or $s_{i,0} = s_c$ for i = 1 ... B. The procedure to determine $s_{i,1}$ is dependent on signal constellation and is described specifically for Gray-mapped 8-PSK and 16-QAM below.

For 8-PSK, the eight signal points in the constellation are uniformly spaced apart by 45° on a unit circle. The closest signal point to y/h is labeled '000' from the procedure described above. For the 8-PSK constellation, the next two closest signal points to y/h are the two neighbor signal points to '000' (i.e., one signal point on the left and another signal point on the right of '000' along the unit circle). Since the constellation is Gray-mapped, these two neighbor signal points differ from '000' in only one bit position. For example, if the two neighbor signal points are labeled as '100' and '010', then $s_{i,1}$ is '100' for the leftmost code bit and is '010' for the middle code bit. The values of $s_{i,1}$ and $s_{i,0}$ for two of the three code bits are thus known and may be used along with the LLRs for these two code bits and the channel gain estimate h to solve for the received symbol y.

For 16-QAM, the 16 signal points are arranged in a two-dimensional grid, and each signal point has at least one neighbor signal point along the real axis and at least one neighbor signal point along the imaginary axis. Since the constellation is Gray-mapped, these neighbor signal points differ from the original signal point in at most one bit position. The closest signal point to y/h is labeled '0000' from the procedure described above. If the two neighbor signal points of the closest signal point $s_c$ are labeled as '1000' and '0001', then $s_{i,1}$ is '1000' for the leftmost code bit and is '0001' for the rightmost code bit. Thus, the values of $s_{i,1}$ and $s_{i,0}$ for two of the four code bits are known and may be used to solve for the received symbol y. The use of one horizontal neighbor and one vertical neighbor avoids a situation with dependent equations.

Figure 6:
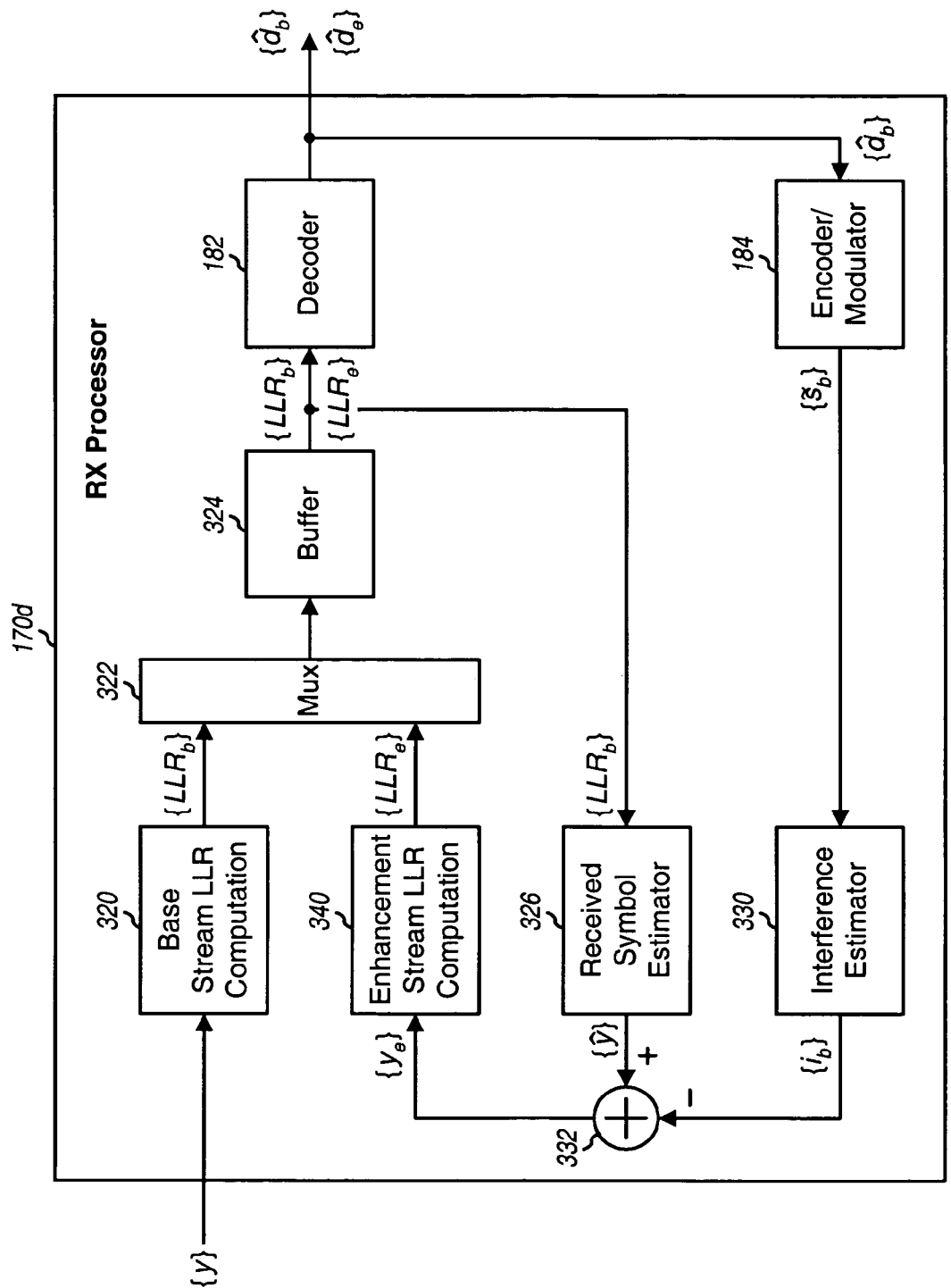
FIG. 6 shows an RX processor for the second data detection scheme with a higher order modulation scheme for the base stream.

FIG. 6 shows an RX processor 170d for the second data detection scheme with the base stream being modulated with a higher-order modulation scheme. RX processor 170d includes most of the units in RX processor 170a in FIG. 3 (without buffer 314) and further includes a received symbol estimator 326.

Base stream LLR computation unit 320 derives the base stream LLRs based on the received symbols {y} and provides the base stream LLRs via multiplexer 322 to buffer 324 for storage. Received symbol estimator 326 receives the base stream LLRs from buffer 324 and derives received symbol estimates {ŷ} based on these LLRs, e.g., as described above. Summer 332 receives and subtracts the interference estimates {î$_b$} from the received symbol estimates {ŷ} and provides interference-canceled symbols {y$_e$}. Enhancement stream LLR computation unit 340 derives the enhancement stream LLRs based on the interference-canceled symbols {y$_e$} and provides the enhancement stream LLRs via multiplexer 322 to buffer 324 for storage.

For clarity, separate LLR computation units are shown for the base stream and enhancement stream in FIGS. 3, 5, and 6. The LLR computation for both streams may be performed by a single LLR computation unit, for example, in a time division multiplex (TDM) manner. All of the computation for data detection may also be performed by a digital signal processor (DSP) having one or more multiply-accumulate units and one or more arithmetic logic units (ALUs). The block diagrams shown in FIGS. 3, 4, 5, and 6 may also be used as flow diagrams for data detection processes.

The data detection techniques described herein may be used for single-carrier as well as multi-carrier systems. Multiple carriers may be provided by OFDM or some other constructs. OFDM effectively partitions the overall system bandwidth into multiple (N) orthogonal subbands, which are also referred to as tones, subcarriers, bins, and frequency channels. With OFDM, each subband is associated with a respective subcarrier that may be modulated with data.

A combined symbol x may be transmitted on each subband used for data transmission. Up to N combined symbols may be transmitted on the N subbands in each OFDM symbol period. The transmitter performs OFDM modulation by transforming each group of N combined and pilot symbols {x(k)}, which is to be transmitted in one OFDM symbol period, to the time domain using an N-point inverse fast Fourier transform (IFFT) to obtain a "transformed" symbol that contains N chips. To combat intersymbol interference (ISI), which is caused by frequency selective fading, a portion (or $N_{cp}$ chips) of each transformed symbol is typically repeated to form a corresponding OFDM symbol. Each OFDM symbol is transmitted in one OFDM symbol period, which is $N+N_{cp}$ chip periods, where $N_{cp}$ is the cyclic prefix length.

The receiver obtains a stream of samples for a received signal and removes the cyclic prefix in each received OFDM symbol to obtain a corresponding received transformed symbol. The receiver then transforms each received transformed symbol to the frequency domain using an N-point fast Fourier transform (FFT) to obtain N received symbols {y(k)} for the N subbands. Each received symbol y(k) is for a combined symbol x(k) or a pilot symbol sent on subband k, which is distorted by the channel gain h(k) and degraded by noise n(k), as shown in equation (2). The received symbols may be serialized and processed as described above for the three data detection schemes.

The data detection techniques described herein may also be used for more than two data streams. The processing (e.g., LLR computation, symbol estimation, interference estimation, and so on) used for the enhancement stream may be repeated for each additional data stream.

The data detection techniques described herein may be implemented by various means. For example, these techniques may be implemented in hardware, software, or a combination thereof. For a hardware implementation, the processing units used to perform data detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the data detection techniques may be implemented with modules (e.g., procedures, functions, and so on) that perform the functions described herein. The software codes may be stored in a memory unit (e.g., memory unit 192 in FIG. 1) and executed by a processor (e.g., controller 190). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing data detection in a wireless communication system, comprising:
    deriving log-likelihood ratios (LLRs) for code bits of a first data stream based on received symbols for a data transmission, wherein the first data stream is a base stream for a hierarchical coded data transmission;
    deriving data symbol estimates for the first data stream based on the received symbols;
    decoding the LLRs for code bits of the first data stream to obtain decoded data for the first data stream;
    estimating interference due to the first data stream based on the data symbol estimates for the first data stream;
    re-encoding and remodulating the decoded data to obtain remodulated symbols for the first data stream;

deriving enhancement LLRs based on the estimated interference due to the first data stream and the received symbols;
adjusting the enhancement LLRs based on the remodulated symbols and the data symbol estimates, comprising:
detecting errors in the data symbol estimates based on the remodulated symbols, and
setting LLRs for code bits of the data symbol estimates detected to be in error to erasures for decoding; and
computing a decoded enhancement stream based on the enhancement LLRs, wherein the decoded enhancement stream is an enhancement stream for the hierarchical coded data transmission.

2. The method of claim 1, wherein the LLRs for the code bits of the first data stream are derived from the received symbols in real-time without buffering the received symbols.

3. The method of claim 1, further comprising:
storing the LLRs for the code bits of the first data stream in a buffer; and
storing the enhancement LLRs in the buffer by overwriting the LLRs for the code bits of the first data stream.

4. The method of claim 1, wherein quadrature phase shift keying (QPSK) is used for both the first and enhancement data streams.

5. The method of claim 1, wherein a modulation scheme with a higher order than quadrature phase shift keying (QPSK) is used for the first data stream, the method further comprising:
deriving received symbol estimates based on the LLRs for the code bits of the first data stream, and wherein enhancement LLRs are derived based on the received symbol estimates and the estimated interference.

6. The method of claim 5, wherein the deriving received symbol estimates includes:
forming two equations for each received symbol based on LLRs for all code bits of a data symbol carried in the received symbol for the first data stream, and wherein a received symbol estimate for the received symbol is derived from the two equations.

7. The method of claim 1, wherein the LLRs for code bits of the first data stream and the enhancement LLRs are derived based on a dual-max approximation.

8. The method of claim 1, further comprising:
deriving channel gain estimates for a wireless channel used for the data transmission, and wherein the LLRs for code bits of the first stream, the enhancement LLRs and the interference due to the first data stream are derived with the channel gain estimates.

9. The method of claim 1, wherein the wireless communication system utilizes orthogonal frequency division multiplexing (OFDM), and wherein the received symbols are from a plurality of subbands.

10. An apparatus for a wireless communication system, comprising:
a first computation unit configured to derive log-likelihood ratios (LLRs) for code bits of a first data stream based on received symbols for a data transmission;
a second computation unit configured to derive data symbol estimates for the first data stream based on the received symbols;
modules configured to compute a decoded base stream based on the LLRs for code bits of the first data stream received from the first computation unit;
an interference estimator configured to estimate interference due to the first data stream based on the data symbol estimates for the first data stream;
an encoder and modulator configured to re-encode and remodulate the decoded base stream to obtain remodulated symbols for the first data stream;
a third computation unit configured to derive enhancement LLRs by subtracting the estimated interference due to the first data stream from the received symbols;
a LLR adjustment unit configured to adjust the LLRs for code bits of the enhancement stream by:
detecting errors in the data symbol estimates based on the remodulated symbols, and
setting LLRs for code bits of the data symbol estimates detected to be in error to erasures for decoding; and
modules configured to compute a decoded enhancement stream based on the enhancement LLRs.

11. The apparatus of claim 10, further comprising:
a buffer configured to store the LLRs for the code bits of the first data stream and to store the enhancement LLRs by overwriting the LLRs for the code bits of the first data stream.

12. The apparatus of claim 10, further comprising:
a channel estimator configured to derive channel gain estimates for a wireless channel used for the data transmission, and wherein the LLRs for the code bits of the first data stream, the enhancement LLRs and the interference due to the first data stream are derived with the channel gain estimates.

13. An apparatus for a wireless communication system, comprising:
means for receiving a hierarchical coded data transmission, the hierarchical coded data transmission comprising a base stream and an enhancement stream;
means for deriving log-likelihood ratios (LLRs) for code bits of the base stream based on received symbols for the hierarchical coded data transmission, wherein the LLRs for the code bits of the base stream are derived from the received symbols in real-time without buffering the received symbols;
means for deriving data symbol estimates for the base stream based on the received symbols;
means for decoding the LLRs for the code bits of the first data stream to obtain decoded data for the base stream;
means for estimating interference due to the base stream based on the data symbol estimates;
means for re-encoding and remodulating the decoded data to obtain remodulated symbols for the base stream;
means for deriving LLRs for code bits of the enhancement stream by subtracting the estimated interference due to the base stream from the received symbols;
means for adjusting the LLRs for the code bits of the enhancement stream based on the remodulated symbols and the data symbol estimates, comprising:
means for detecting errors in the data symbol estimates based on the remodulated symbols, and
means for setting LLRs for code bits of the data symbol estimates detected to be in error to erasures for decoding; and
means for computing a decoded enhancement stream based on the LLRs for code bits of the enhancement stream; and
means for storing LLRs for the code bits of the base stream and LLRs for the code bits of the enhancement stream, wherein LLRs for the code bits of the enhancement stream are stored by overwriting the LLRs for the code bits of the base stream.

14. A method of performing data detection in a wireless communication system, comprising:
- deriving log-likelihood ratios (LLRs) for code bits of a first data stream based on received symbols for a data transmission;
- deriving data symbol estimates for the first data stream based on the received symbols or the LLRs for the code bits of the first data stream;
- decoding the LLRs for the code bits of the first data stream to obtain decoded data for the first data stream;
- re-encoding and remodulating the decoded data to obtain remodulated symbols for the first data stream;
- estimating interference due to the first data stream based on the data symbol estimates;
- deriving LLRs for code bits of a second data stream based on the received symbols and the estimated interference;
- adjusting the LLRs for the code bits of the second data stream based on the remodulated symbols and the data symbol estimates for the first data stream;
- performing an error detection function for the data symbol estimates based on the remodulated symbols;
- deriving correction factors for the data symbol estimates detected to be in error; and
- updating LLRs for code bits of the data symbol estimates detected to be in error with the correction factors.

15. The method of claim 14, wherein the data symbol estimates are derived by making hard decisions on either the received symbols or the LLRs for the code bits of the first data stream.

16. The method of claim 14, wherein the LLRs for the code bits of the first and second data streams are derived from the received symbols in real-time without buffering the received symbols.

17. The method of claim 14, further comprising:
- buffering the LLRs for the code bits of the first and second data streams for subsequent decoding.

18. An apparatus for a wireless communication system, comprising:
- a first computation unit configured to derive log-likelihood ratios (LLRs) for code bits of a first data stream based on received symbols for a data transmission;
- a decision unit configured to derive data symbol estimates for the first data stream based on the received symbols;
- an interference estimator configured to estimate interference due to the first data stream based on the data symbol estimates;
- a decoder configured to decode the LLRs for the code bits of the first data stream to obtain decoded data for the first data stream;
- an encoder and modulator configured to re-encode and remodulate the decoded data to obtain remodulated symbols for the first data stream;
- a second computation unit configured to derive log-likelihood ratios (LLRs) for code bits of a second data stream based on the estimated interference and the received symbols;
- a symbol error detector configured to perform an error detection function for the data symbol estimates based on the remodulated symbols; and
- an adjustment unit configured to adjust the LLRs for the code bits of the second data stream based on the remodulated symbols and the data symbol estimates for the first data stream, wherein the adjustment unit is configured to derive correction factors for data symbol estimates detected to be in error and to update LLRs for code bits of the data symbol estimates detected to be in error with the correction factors.

19. An apparatus for a wireless communication system, comprising:
- means for deriving log-likelihood ratios (LLRs) for code bits of a first data stream based on received symbols for a data transmission;
- means for deriving data symbol estimates for the first data stream based on the received symbols;
- means for estimating interference due to the first data stream based on the data symbol estimates;
- means for decoding the LLRs for the code bits of the first data stream to obtain decoded data for the first data stream;
- means for re-encoding and remodulating the decoded data to obtain remodulated symbols for the first data stream;
- means for deriving LLRs for code bits of a second data stream based on the received symbols and the estimated interference;
- means for adjusting the LLRs for the code bits of the second data stream based on the remodulated symbols and the data symbol estimates wherein the means for adjusting comprises:
    - means for deriving correction factors for the data symbol estimates detected to be in error, and
    - means for updating the LLRs for code bits of the data symbol estimates detected to be in error with the correction factors; and
- means for computing a decoded enhancement stream based on the LLRs for code bits of the second data stream.

20. The apparatus of claim 10, wherein the LLRs for the code bits of the first data stream are derived by the first computation unit from the received symbols in real-time without buffering the received symbols.

21. The apparatus of claim 10, wherein quadrature phase shift keying (QPSK) is used for both the first and enhancement data streams.

22. The apparatus of claim 10, wherein the second computation unit is configured to form two equations for each received symbol based on LLRs for all code bits of a data symbol carried in the received symbol for the first data stream, and wherein a received symbol estimate for the received symbol is derived from the two equations.

23. The apparatus of claim 10, wherein the LLRs for code bits of the first data stream and the enhancement LLRs are derived based on a dual-max approximation.

24. The apparatus of claim 10, further comprising a fourth computation unit configured to derive channel gain estimates for a wireless channel used for the data transmission, and wherein the LLRs for code bits of the first stream, the enhancement LLRs and the interference due to the first data stream are derived with the channel gain estimates.

25. The apparatus of claim 10, wherein the wireless communication system utilizes orthogonal frequency division multiplexing (OFDM), and wherein the received symbols are from a plurality of subbands.

26. The apparatus of claim 13, wherein the LLRs for the code bits of the first data stream are derived by the first computation unit from the received symbols in real-time without buffering the received symbols.

27. The apparatus of claim 13, wherein quadrature phase shift keying (QPSK) is used for both the first and enhancement data streams.

28. The apparatus of claim 13, further comprising means for forming two equations for each received symbol based on LLRs for all code bits of a data symbol carried in the received symbol for the first data stream, and wherein a received symbol estimate for the received symbol is derived from the two equations.

29. The apparatus of claim 13, wherein the LLRs for code bits of the first data stream and the enhancement LLRs are derived based on a dual-max approximation.

30. The apparatus of claim 13, further comprising means for deriving channel gain estimates for a wireless channel used for the data transmission, and wherein the LLRs for code bits of the first stream, the enhancement LLRs and the interference due to the first data stream are derived with the channel gain estimates.

31. The apparatus of claim 13, wherein the wireless communication system utilizes orthogonal frequency division multiplexing (OFDM), and wherein the received symbols are from a plurality of subbands.

32. A non-transitory computer-readable medium having stored thereon computer-executable instructions for:
deriving log-likelihood ratios (LLRs) for code bits of a first data stream based on received symbols for a data transmission, wherein the first data stream is a base stream for a hierarchical coded data transmission;
deriving data symbol estimates for the first data stream based on the received symbols;
decoding the LLRs for code bits of the first data stream to obtain decoded data for the first data stream;
estimating interference due to the first data stream based on the data symbol estimates for the first data stream;
re-encoding and remodulating the decoded data to obtain remodulated symbols for the first data stream;
deriving enhancement LLRs based on the estimated interference due to the first data stream and received symbols;
adjusting the enhancement LLRs based on the remodulated symbols and the data symbol estimates, comprising:
detecting errors in the data symbol estimates based on the remodulated symbols, and
setting LLRs for code bits of the data symbol estimates detected to be in error to erasures for decoding; and
computing a decoded enhancement stream based on the enhancement LLRs, wherein the decoded enhancement stream is an enhancement stream for the hierarchical coded data transmission.

33. The computer-readable medium of claim 32, wherein the LLRs for the code bits of the first data stream are derived from the received symbols in real-time without buffering the received symbols.

34. The computer-readable medium of claim 32, further comprising instructions for:
storing the LLRs for the code bits of the first data stream in a buffer; and
storing the enhancement LLRs in the buffer by overwriting the LLRs for the code bits of the first data stream.

35. The computer-readable medium of claim 32, wherein quadrature phase shift keying (QPSK) is used for both the first and enhancement data streams.

36. The computer-readable medium of claim 32, wherein a modulation scheme with a higher order than quadrature phase shift keying (QPSK) is used for the first data stream, further comprising instructions for:
deriving received symbol estimates based on the LLRs for the code bits of the first data stream, and wherein enhancement LLRs are derived based on the received symbol estimates and the estimated interference.

37. The computer-readable medium of claim 36, wherein the deriving received symbol estimates includes:
forming two equations for each received symbol based on LLRs for all code bits of a data symbol carried in the received symbol for the first data stream, and wherein a received symbol estimate for the received symbol is derived from the two equations.

38. The computer-readable medium of claim 32, wherein the LLRs for code bits of the first data stream and the enhancement LLRs are derived based on a dual-max approximation.

39. The computer-readable medium of claim 32, further comprising instructions for:
deriving channel gain estimates for a wireless channel used for the data transmission, and wherein the LLRs for code bits of the first stream, the enhancement LLRs and the interference due to the first data stream are derived with the channel gain estimates.

40. The computer-readable medium of claim 32, wherein a wireless communication system utilizes orthogonal frequency division multiplexing (OFDM), and wherein the received symbols via the wireless communication are from a plurality of subbands.

41. The apparatus of claim 18, wherein the decision unit is configured to derive data symbol estimates by making hard decisions on either the received symbols or the LLRs for the code bits of the first data stream.

42. The apparatus of claim 18, wherein the LLRs for the code bits of the first and second data streams are derived from the received symbols in real-time without buffering the received symbols.

43. The apparatus of claim 18, further comprising a buffer configured to buffer the LLRs for the code bits of the first and second data streams for subsequent decoding.

44. The apparatus of claim 19, wherein the data symbol estimates are derived by making hard decisions on either the received symbols or the LLRs for the code bits of the first data stream.

45. The apparatus of claim 19, wherein the LLRs for the code bits of the first and second data streams are derived from the received symbols in real-time without buffering the received symbols.

46. The apparatus of claim 19, further comprising means for buffering the LLRs for the code bits of the first and second data streams for subsequent decoding.

47. A non-transitory computer-readable medium having stored thereon computer-executable instructions for:
deriving log-likelihood ratios (LLRs) for code bits of a first data stream based on received symbols for a data transmission;
deriving data symbol estimates for the first data stream based on the received symbols or the LLRs for the code bits of the first data stream;
decoding the LLRs for the code bits of the first data stream to obtain decoded data for the first data stream;
re-encoding and remodulating the decoded data to obtain remodulated symbols for the first data stream;
estimating interference due to the first data stream based on the data symbol estimates;
deriving LLRs for code bits of a second data stream based on the received symbols and the estimated interference;
adjusting the LLRs for the code bits of the second data stream based on the remodulated symbols and the data symbol estimates for the first data stream;
performing an error detection function for the data symbol estimates based on the remodulated symbols;

deriving correction factors for the data symbol estimates detected to be in error; and updating LLRs for code bits of the data symbol estimates detected to be in error with the correction factors.

48. The computer-readable medium of claim 47, wherein the data symbol estimates are derived by making hard decisions on either the received symbols or the LLRs for the code bits of the first data stream.

49. The computer-readable medium of claim 47, wherein the LLRs for the code bits of the first and second data streams are derived from the received symbols in real-time without buffering the received symbols.

50. The computer-readable medium of claim 47, further comprising instructions for buffering the LLRs for the code bits of the first and second data streams for subsequent decoding.

* * * * *